(No Model.)
L. J. M. LOISEL.
PNEUMATIC TIRE.
No. 587,009. Patented July 27, 1897.
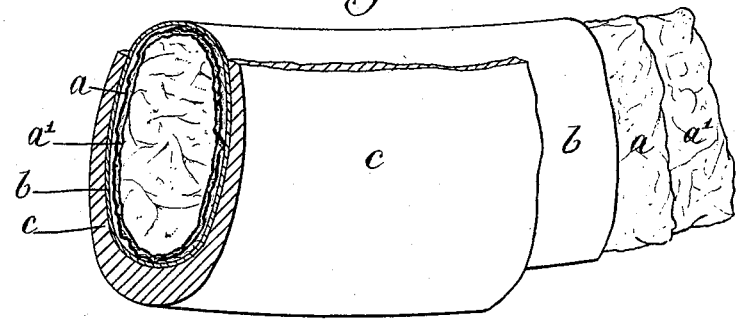
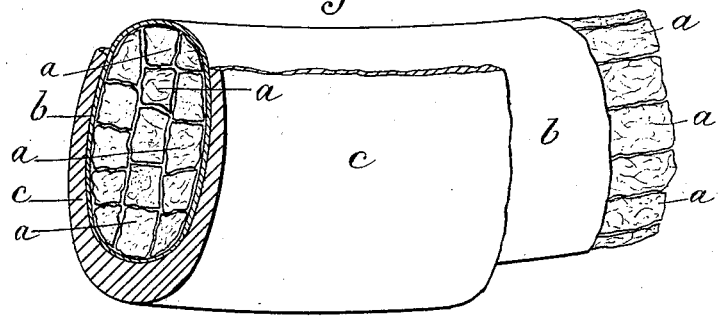
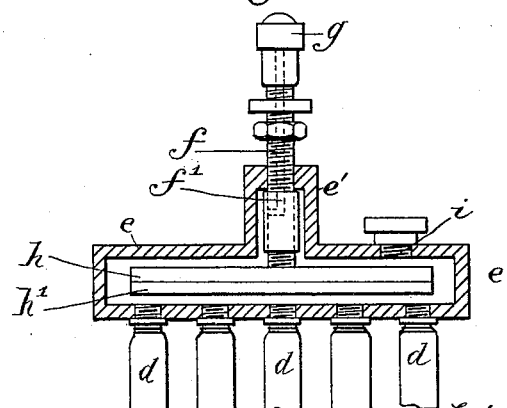
Witnesses:—
George Barry.
C. L. Sundgren
Inventor:-
Louis Jean Marie Loisel
by attorneys
Brown & Seward

UNITED STATES PATENT OFFICE.

LOUIS JEAN MARIE LOISEL, OF TERGNIER, FRANCE, ASSIGNOR TO MICHELIN & CO., OF CLERMONT-FERRAND, FRANCE.

PNEUMATIC TIRE.

SPECIFICATION forming part of Letters Patent No. 587,009, dated July 27, 1897.

Application filed February 27, 1893. Serial No. 463,791. (No model.) Patented in Germany February 7, 1893, No. 69,614; in Italy April 6, 1893, LXVI, 132, and in England April 15, 1893, No. 7,733.

*To all whom it may concern:*

Be it known that I, LOUIS JEAN MARIE LOISEL, of Tergnier, in the Department of Aisne, in the Republic of France, have invented a new and useful Improvement in the Air-Chambers of Pneumatic Wheel-Tires, of which the following is a specification, and for which I have obtained patents in England, No. 7,733, dated April 15, 1893; in Germany, No. 69,614, dated February 7, 1893, and in Italy, LXVI, 132, dated April 6, 1893.

The object of this invention is to render it almost impossible that the air-chamber of a pneumatic tire should be penetrated by pointed or cutting bodies encountered on the road, and even in case that happens to prevent the escape of air by a rapid repair of the damage, a repair which will be almost always made automatically and which in any case may be made by hand upon the spot with facility.

I form the air-chamber of a simple tube or a number of tubes of thin supple material impermeable to air and preferably elastic and a surrounding or inclosing envelop, the said tube, if a simple one be employed, having a normal caliber larger and a length greater than those of the said envelop, or the said tubes, if multiple and arranged one within another, each having such a larger normal caliber and greater length, or the said tubes, if multiple and arranged separate from each other in a group, having an aggregate caliber larger and a length greater than the said envelop, the said air-chamber thus having in its normal condition—that is to say, without the said envelop—greater dimensions in all directions than the said envelop itself. The said envelop may be constituted either by the tire itself or, which is preferable, by an interposed tube having approximately the same diameter as the cavity of the tire. The air-chamber thus formed should be capable of displacing itself easily in its envelop, and for this purpose I interpose between said tubes and the envelop and also between the several tubes themselves, when more than one is employed, a liquid, as water, which constitutes a lubricant to facilitate the slipping of the contiguous surfaces of the air tube or tubes upon or against the surfaces of the envelop and upon or against each other. The said liquid also constitutes a mobile packing, which serves to preserve an equilibrium of pressure between the interiors of the air-tubes and any spaces which are formed between the exteriors of the said tubes and the interior of the envelop, as hereinafter explained.

Figure 1 of the drawings gives a perspective view of a portion of my air-chamber composed of two concentric creased, puckered, or gathered tubes arranged one within the other and inclosed within an envelop which is itself contained in the tire. Fig. 2 is a similar view of my second type of air-chamber with a number of creased, puckered, or gathered tubes of small diameter placed side by side or in a group within the envelop and forming an air-chamber having a number of compartments. Fig. 3 is a transverse sectional view of a device attached to the felly to permit the simultaneous inflation of all the compartments of the multitubular chamber represented in Fig. 2 with air at the same pressure, as well as to close communication of all those tubes with the exterior when they have been inflated.

Similar letters of reference designate corresponding parts in all the figures.

In the example shown in Fig. 1 it may be seen that the concentric tubes $a\,a'$ form multiple walls of the "air-reservoir," properly so called. These tubes are of any thin supple material impermeable to air, such as goldbeater's skin or silk or other tissue prepared with india-rubber, are longer and of greater transverse caliber than the envelop $b$, which contains them, and consequently present numerous creases, puckers, or gathers in every direction, as I have represented. Fig. 1 also shows these creased, puckered, or gathered tubes inclosed in the envelop $b$, which is placed within the tire $c$, but this intermediate envelop is not indispensable, for the said tubes $a\,a'$ might be placed directly in the tire $c$, which is to be attached to the felly, but it is preferable to employ the intermediate envelop $b$ to inclose and prevent the loss of the lubricating and packing liquid with which I surround the tube or tubes a a' and to facilitate the manual displacement of the tire and of the air-chamber relatively to each other, as will be presently explained. The said envelop b may be made of the same material as the tire or of a different material. It is obvious that the inner tube a' may be dispensed with, the air-chamber then having a simple instead of a multiple wall.

It will be seen that the wall, simple or multiple, of the air-chamber, by reason of the amplitude which is given to it, though filled with compressed air, is not distended, but loose, and consequently if it happens to be pierced by a nail or other sharp body it will not thereby be caused to burst or be subjected to a great rent. This is important, but it may be remarked, further, that by reason of this amplitude and of the liberty of movement permitted by the lubricating and packing liquid to the puckered, creased, or gathered wall it will more often be simply pressed in by the nail or sharp point or edge, giving way without opposing any resistance to it, and will not be pierced at all. This is what would occur if it was made of extremely thin india-rubber, for then, even supposing the parts adjacent to the point attacked did not furnish slack material abundantly enough and easily enough to avoid any serious pressure of the nail upon its wall, such pressure would first be distributed over a great length owing to the stretching of the material before perforation would occur, and the pressure so distributed would be transmitted to the air in the chamber and through it to the lubricating and packing liquid between the air-chamber and the envelop, which liquid would then fill the cavity produced by the raising of any point of the wall by the nail, thus maintaining an equilibrium of pressure upon its two faces. The lubricating and packing liquid is thus as much a part of the tire as are the air-chamber and the envelop. If, nevertheless, it happens that the wall a is perforated, there are chances in the case of a multiple wall that the wall a', which is behind a, or one of those which may be still farther inside, may be raised by the nail without being pierced, in which case it is clear that there will be no leakage; but suppose that all the walls of the multiple system of which the air-chamber may be composed should be perforated the system may be depended upon to close the openings, at least almost always. It may be understood, in fact, that when the walls have accomplished a certain movement without being guided at at any point, since they are entirely free, they return to their places, and what holes may be in these different walls will not go back opposite each other. The opening of one of the walls will thus be closed by an intact part of the next wall, which will be pressed forcibly into it by the interior air-pressure, and the more thicknesses the chamber comprises the more certain will be this automatic repair. Even if there should be only a single wall a, that would be sufficient to obtain this effect if the said wall had sufficient amplitude and was very supple and free in its movements.

If so great an opening or rent should be produced that the automatic displacement of the walls, one relatively to the other, would not be sufficient to close it, their relative displacement may, owing to the lubricating liquid, easily be produced by moving the tire longitudinally a little way by hand while the air-chamber remains fixed or by moving the air-chamber longitudinally while the tire remains fixed or else by displacing both to change their positions with respect to the envelop b. In this way a certain closing of the opening may be effected. It may be understood that the mode of attachment of the tire and of the air-chamber upon the felly may be conveniently selected to permit these movements to be produced in the easiest manner.

The multitubular arrangement represented in Fig. 2 operates on the same principle as the arrangement of concentric tubes which I have just described, each of the small impermeable tubes a presenting the same characters of amplitude, suppleness, and liberty of movement as the larger ones, and this arrangement offers the supplementary advantage of dividing the compressed air in the chamber in such manner that the tire would lose little of its air in case of its being torn sufficiently to permit a leakage, because that would only affect one single compartment of the reservoir. It may be easily understood, moreover, that in such a case the other tubes would dilate more and fill the space resulting from the collapsing of the perforated or torn tube. It will scarcely ever happen, at the worst, that the tube will completely empty itself, for one of the contiguous tubes, according to the position it occupies, would be almost sure to close the opening. The employment of india-rubber in preference to any other substance for the tubes has the same advantage in this arrangement shown in Fig. 2 as that shown in Fig. 1, by reason of the necessity for the nail or other perforating body to press in a greater length of this substance without being able to pierce it. It hardly needs to be stated that I employ in this example the lubricating and packing liquid, as hereinbefore described, to insure the liberty of movement of the walls.

In both arrangements described the tubes forming the air-chamber are preferably interrupted—that is to say, closed at their extremities where the joints are made.

The means which I propose to use for inflating at the same time all the tubes, compartments, or elements of my multitubular air-chamber are represented in Fig. 3. Each of these compartments or elements a is connected by a simple india-rubber tube d and a metallic coupling to a distribution-box e, which is to be attached to the felly of the wheel. This box has a projecting nozzle e', the end of which is tapped to receive the thread of a screw $f$, in which there is a longitudinal channel $f'$, which debouches on one side. This screw constitutes a tube to which the tube of the inflating-pump may be attached, and which may be closed by a stopper $g$ when the inflation is complete. The lower extremity of this screw $f$ has attached to it a metallic disk $h$, faced with a sheet of india-rubber $h'$ and constituting a valve. By turning the screw $f$ in one direction the said valve is pressed down to close simultaneously all the orifices in the box $e$ at the connections of the several tubes $d$, and so to isolate all the air-compartments $a$. By turning the said screw in the other direction the several tubes $d\ d$ are opened to permit all the compartments $a$ to be filled simultaneously by the pump or to permit them to be all emptied simultaneously by removing the stopper $i$ from an orifice provided in the top of the box for the purpose.

What I claim as my invention, and desire to secure by Letters Patent, is—

1. In a pneumatic wheel-tire, the combination of a containing envelop, an air-chamber composed of thin supple and impermeable material contained within said envelop and having greater dimensions than the said envelop whereby its walls are puckered or gathered within said envelop, and a lubricating and packing liquid inclosed between the interior of said envelop and the exteriors of said walls, substantially as and for the purpose herein set forth.

2. The combination with an air-chamber having several compartments in a pneumatic wheel-tire, an air-box common to said several compartments, a valve in said box for opening or closing said several compartments simultaneously, a screw for operating the said valve constituting also a channel for the inflation of the several compartments simultaneously through said air-box, and a stopper on said screw for closing said channel, all substantially as herein set forth.

In witness whereof I have hereunto set my hand in the presence of two subscribing witnesses.

LOUIS JEAN MARIE LOISEL.

Witnesses:
HENRY THIESSE,
ROBT. M. HOOPER.